United States Patent [19]

Hunt

[11] 4,019,689

[45] Apr. 26, 1977

[54] FOOD MATERIAL CHOPPER

[75] Inventor: William Joseph Hunt, London, England

[73] Assignee: Beed (Dishwashers) Limited, Ipswich, England

[22] Filed: Oct. 15, 1975

[21] Appl. No.: 622,461

[30] Foreign Application Priority Data

Oct. 18, 1974 United Kingdom ............... 4554/74

[52] U.S. Cl. .......................................... 241/282.1
[51] Int. Cl.² ...................................... B02C 18/18
[58] Field of Search .......... 241/46.17, 199.12, 277, 241/282.1, 282.2

[56] References Cited

UNITED STATES PATENTS

| | | | |
|---|---|---|---|
| 2,203,672 | 6/1940 | Chester | 241/199.12 |
| 2,576,802 | 11/1951 | Morris | 241/282.1 X |
| 2,953,179 | 9/1960 | Friess | 241/282.1 X |
| 3,139,917 | 7/1964 | Elmore | 241/199.12 |
| 3,434,518 | 3/1969 | Motis | 241/199.12 |
| 3,784,118 | 6/1974 | Hurwitz | 241/282.1 |

*Primary Examiner*—Roy Lake
*Assistant Examiner*—Howard N. Goldberg
*Attorney, Agent, or Firm*—M. Richard Page; Alexis Barron

[57] ABSTRACT

A chopper unit for food material, having a shaft adapted to receive a drive at one end and cutter blades at the other end thereof. A tubular member journals the shaft and is arranged for non-rotatable connection with a motor drive unit. A ring having a sharpened edge surrounds the cutter blades, with apertures for chopped food provided between the ring and the tubular member. A two-speed motor unit may also be provided.

12 Claims, 11 Drawing Figures

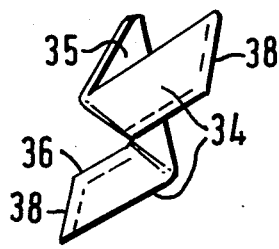
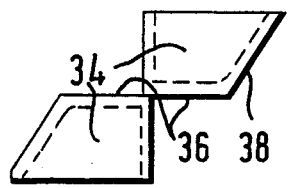
FIG.3    FIG.4
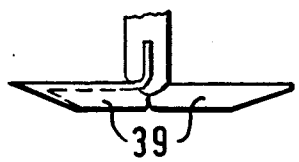
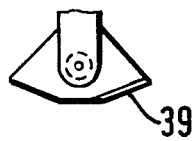
FIG.5    FIG.6
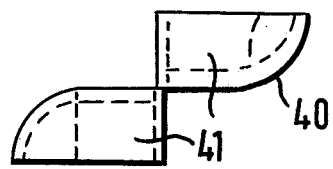
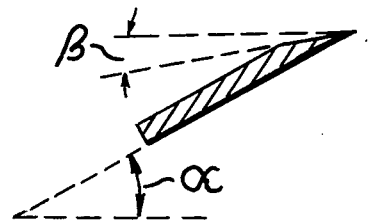
FIG.7    FIG.10
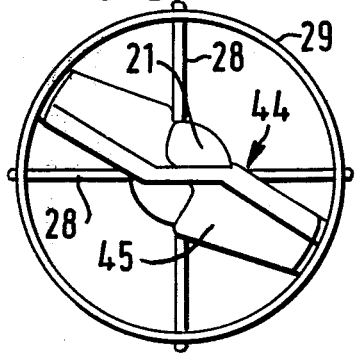
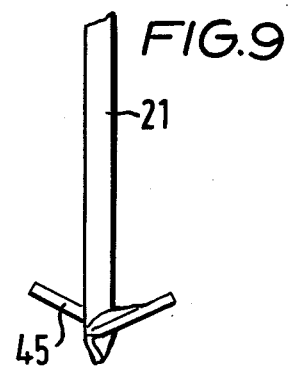
FIG.8    FIG.9

FOOD MATERIAL CHOPPER

BACKGROUND OF THE INVENTION

1. Field of the Invention

This invention relates to a chopper unit for chopping food materials, and to an apparatus in which such a copper unit is in combination with a motor drive unit.

2. Description of the Prior Art

Many forms of apparatus conventionally known as "food mixers"and intended for domestic use are available on the market. In such apparatus, a motor unit is provided to which any one of a number of implements for mechanically operating on food material can be connected. These operations include for example beating, shredding, mixing and liquidizing. The known forms of shredding units are large and relatively complex — in so far as they have many separate parts which are both difficult to manufacture, and subsequently when used, difficult to clean. On the other hand, relatively simple units have been designed which are intended primarily for liquidizing, but these are virtually useless for chopping or shredding. One such proposal has cutting blades carried at the end of the shaft, the shaft being journalled in a sleeve which is held against rotation when in use and has at its free end adjacent the blades a disc with a plurality of tongues extending parallel to the shaft axis, around the blades. The tongues serve principally as a guard for the rotating blades so as to stop the blades contacting the inner walls of a container when in use. It is apparent that although such a unit is most effective for liquidizing semi-solid foods — such as grapes — it is prevented from shredding or chopping solid food materials by the tongues. Even if the food material is first cut into small pieces so that the blades may effectively operate thereon, the end result tends to be a pulp or mash of the food material.

SUMMARY OF THE INVENTION

It is a principal object of this invention to provide a chopper unit capable of chopping food materials effectively and yet which can be used for liquidizing when operated at a high rotational speed.

In accordance with that object, our chopper unit for chopping food material has a shaft arranged to receive a rotational drive at one end, cutter blade means secured to the shaft at the other end thereof, a generally tubular member rotatably mounting the shaft and extending towards the cutter blade means, and a ring supported by the tubular member so as to surround the cutter blade means, the ring having a cutting edge extending around at least the major part of the periphery of the area swept by the blade means at a position longitudinally of the shaft beyond the blade means, there being at least one aperture for chopped food material between the ring and the tubular member supporting the ring.

A further object of this invention is to provide an apparatus for chopping food material comprising the combination of such a chopper unit and a motor unit, the motor unit having an electric motor, a rotational drive output from the motor connected to the chopper unit shaft, and a non-rotatable connection to the chopper unit tubular member.

Other objects and advantages of the invention will become apparent from the following detailed description of the invention.

BRIEF DESCRIPTION OF THE DRAWINGS

The invention will be readily understood from the following illustrative description and accompanying drawings, in which:

FIG. 3 is a perspective view of the cutting blade element of the chopper unit;

FIG. 4 is an underneath view of the blade element;

FIGS. 5 and 6 are side views from positions angularly spaced by 90° of a modified blade element;

FIG. 7 is an underneath view of a second modified blade element;

FIG. 8 is a like view of a third form of blade element in a chopper unit;

FIGS. 9 and 10 are side and fragmentary views respectively of the blade element of FIG. 8.

DETAILED DESCRIPTION OF THE PREFERRED EMBODIMENTS

Figure 1:
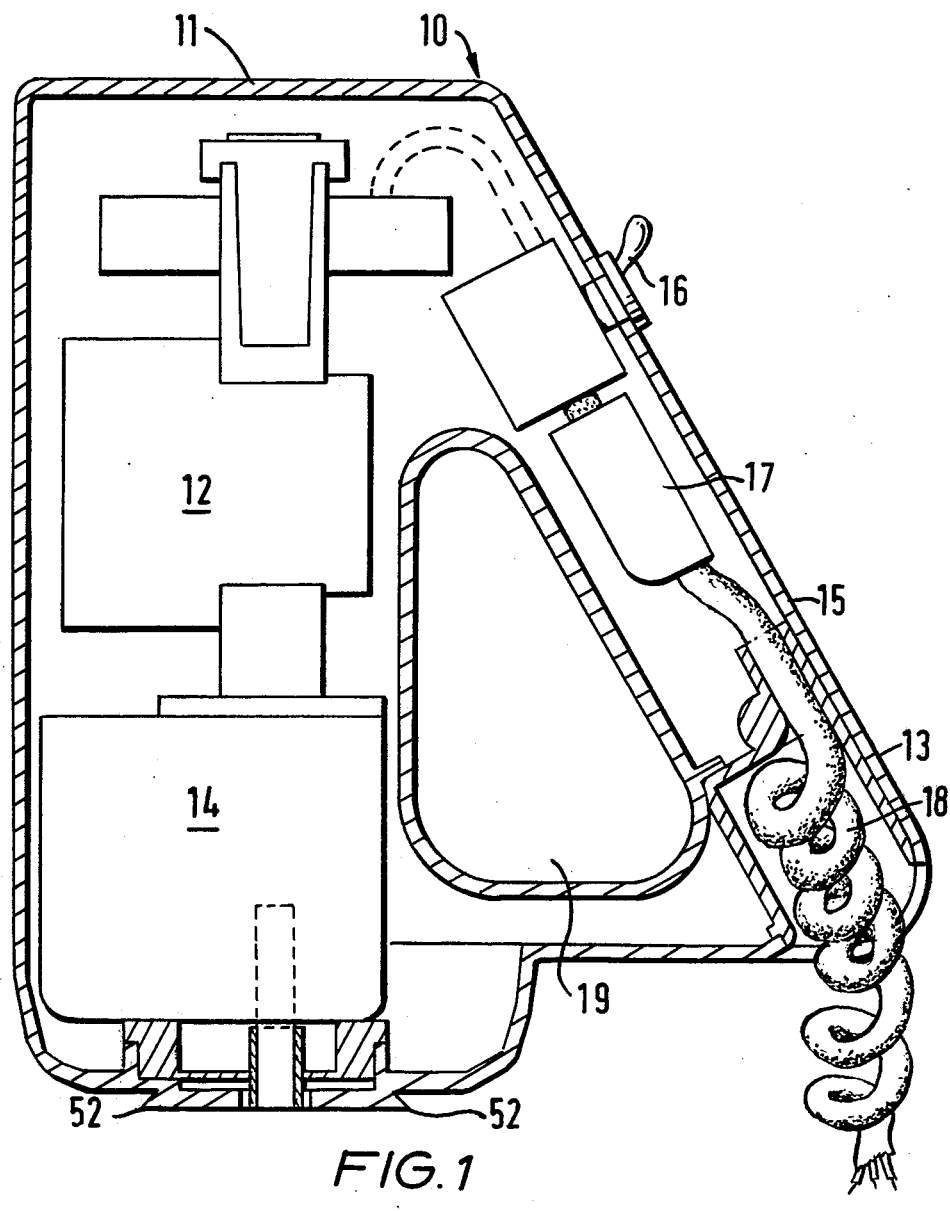
FIG. 1 is a sectional side view of a motor drive unit for use with a chopper unit of this invention.

As shown in FIG. 1 of the drawings, a motor drive unit 10 for use with a chopper unit in accordance with the invention comprises a generally cylindrical casing 11 containing an electric motor 12 the drive shaft of which extends generally axially of the casing to a gear box 14. A handle portion 15 extends obliquely and downwardly away from the upper end of the casing 11 and mounts a switch 16 for the motor, providing an off-position and high and low speed positions. A continuously variable speed control can be provided instead, in which case the switch could be either incorporated in the speed control or arranged to be a simple on/off switch. The handle portion 15 contains an interference suppressor 17 and the lower end 13 of the handle is recessed so as to receive the end portion of a coiled electric cable 18 by which the drive unit can be connected to a mains supply. The recess serves to hold the end portion of the cable and eliminates the need to provide special cable-entry grommet assemblies. Adjacent the recess, the handle portion 15 is turned back to join the lower end of the casing, thereby forming an aperture 19 for reception of a user's fingers when the handle portion 15 is grasped. The motor drive unit 10 is intended for use with a variety of implements for treating material and the gear box 14 has three drive outputs the axes of all of which are generally parallel to the axis of the casing 11 and one of which is intended to drive a chopper unit of this invention and the other two of which are arranged as a pair for driving implements such as a pair of conventional beaters or mixer whisks or paddles. Means (not shown) are provided for changing the gear ratio of the gear box 14 such that the chopper unit drive output may run at a relatively low speed, generating a high torque, or at a relatively high speed, but generating only a low torque.

Figure 2:
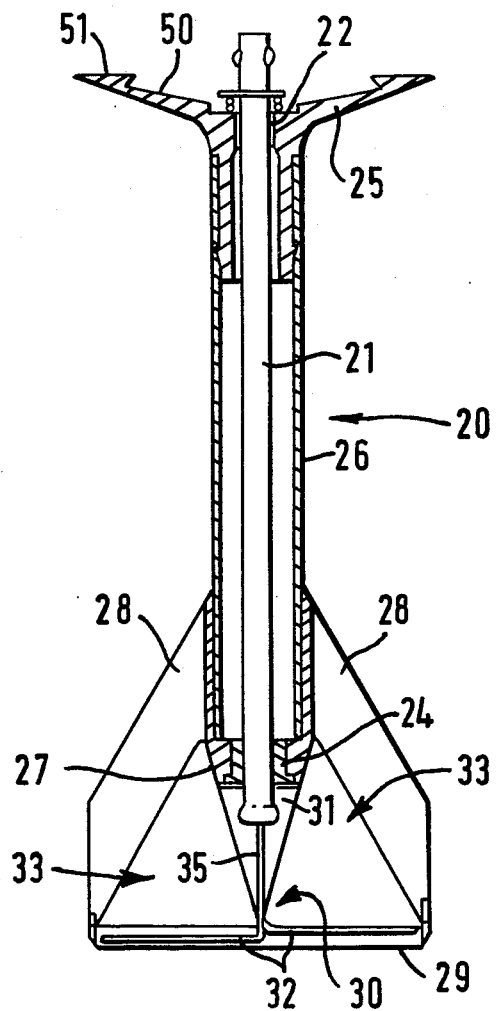
FIG. 2 is a sectional side view of a chopper unit in accordance with the invention.

A drive unit such as that of FIG. 1 can be releasably connected in a way described below with a chopper unit 20 embodying the invention, shown in FIG. 2. This unit comprises a metal shaft 21 for receiving a drive from the gear box of the drive unit through a suitable coupling. The shaft 21 is journalled in bearings 22, 24 in a tubular member 26 having a top fixing element 25 for connection to the casing 11. At the other, lower end of the tubular member are fixed four equi-spaced parallelogram-shaped radial fins 28 extending obliquely downwardly and supporting at their ends a ring 29 in the form of a short tube. The ring 29 has its lower end sharpened to provide a cutting edge which is preferably continuous, though it may be serrated. The ring 29 is spaced below the lower end of the tubular member 26, so that there are four substantial apertures 33 at the lower end of the unit 20, between the fins 28, the ring 29 and the lower end of the tubular member 26, through which chopped food material can pass.

The lower end of the shaft 21 protrudes beyond the lower bearing 24 at the end of the tubular member 26 and is secured to a cutter blade assembly 30 comprising a connection piece 31 and a blade element 32 having two blades 34 formed integrally from a metal strip. The connection piece 31 is conical wwith the apex downwards and its outer surface is continued by an extension of the tubular member 26 in the form of a frusto-conical fitting 27 containing the bearing 24.

As better appears from FIGS. 3 and 4, the blade element 32 has a central triangular portion 35, for securing to the connection piece 31, from one edge of which the blades 34 are folded in at right angles to the portion 35. The blades each have a sharpened cutter edge comprising a inner portion 36 extending on a diameter and an outer portion 38 which is inclined rearwardly to the diameter in the normal direction of rotation. The blades 34 are slightly spaced axially so that the lower one can advance the blade element 32 into the material.

In a modification of the blade element shown in FIGs. 5 and 6, to achieve a similar effect the blades 39 are each inclined upwardly, that is, each is at an inclination to a plane including the diameter and normal to the shaft axis. In a further modification, shown in FIG. 7 and applicable to either of the blade elements previously described, the outer edge portion 40 of each blade 41 is convexly curved.

Yet another form of blade element 44 is shown in FIGS. 8, 9 and 10. This blade element has a continuous leading cutting edge which extends along generally propeller-shaped blades 45 and the cutting edge portions which extend along the blades meet at a centrally disposed edge lying on the axis of the shaft 21. The peripheral edges of the blades are arcuate and concentric with the axis of the ring 29.

Where the blades are inclined to a plane normal to the axis of the shaft 21, the angle of inclination, $\alpha$, is preferably in the range of 20° to 30°. The peripheral edges of the blades are preferably spaced about 0.02 in. from the interior surface of the ring 29.

The trailing edge of each blade preferably lies in a plane substantially parallel to the rotational axis of the blade element and each cutter edge preferably makes an angle, $\alpha$, in the range of ½° to 3° to a plane normal to the axis of the shaft 21.

The chopper unit 20 can be assembled for use with the drive unit 10 by means of a bayonet-type coupling. As shown in FIG. 2, the top fixing element 25 is tubular and has at its lower end a rearward taper leading to an annular flange 50 received in an internal groove in the tubular member 26 for permanent assembly therewith. Around the bearing 22, the upper end of the fitting flares outwardly and is formed at its outer edge with a plurality of inwardly projecting angularly spaced lugs 51. As shown in FIG. 1, the casing 11 is formed at its lower end with a plurality of angularly spaced outwardly projecting lugs 52 co-operable with the lugs 51, which are placed therebetween, the unit 10 being then turned about the axis releasably to latch the lugs 51 between the lugs 52 and the lower end of the casing 11. The shaft 21 is coupled automatically to the first rotational drive output, formed as a sleeve with longitudinal slots opening from the lower end for receiving pins or other projections extending radially from the shaft.

Figure 11:
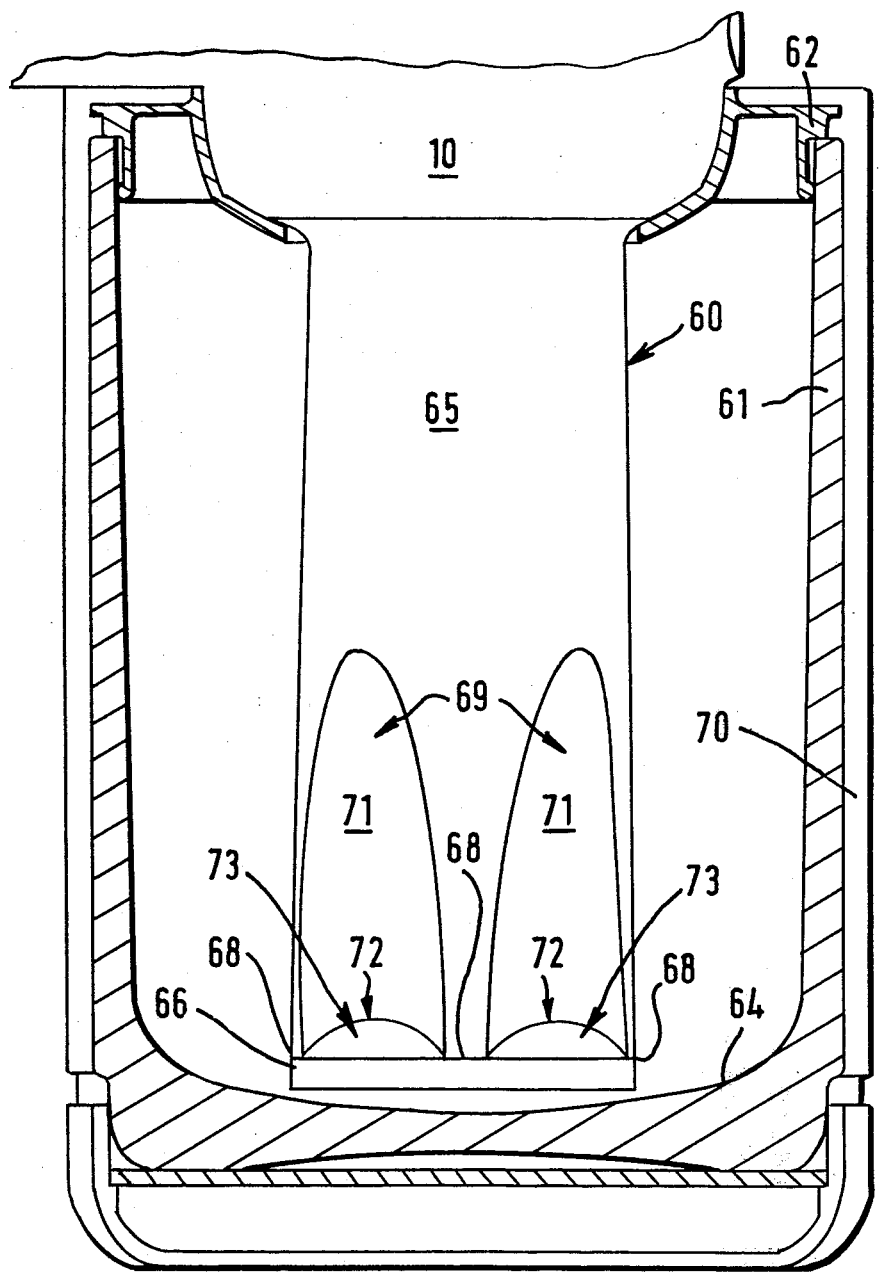
FIG. 11 is a part-sectional side view of another embodiment of chopper unit of this invention and connected to the drive unit of FIG. 1, the chopper unit being received in a container for food material.

A motor drive unit and a chopper unit embodying the invention are conveniently used in conjunction with a vessel or container for the food material. FIG. 11 shows a modified chopper unit 60 releasably secured to the drive unit 10 which is supported on a container 61 by a collar 62 so that the blade element of the unit 60 is in an appropriate relationship with the container floor 64. The container 61 is shown received in a support structure 70, though the container itself may instead be shaped to connect with the drive unit 10. The unit 60 comprises a shaft, a tubular member 65, a cutter blade and a ring 66, all generally similar to those already described. The tubular member 65, in which the shaft again is journalled, is however of different shape from that shown in FIG. 2. Here, the tubular member is of substantially the same diameter as the ring 66, and extends downwardly from its releasable connection with the drive unit 10 to support the ring 66 directly at positions 68 between four grooves 69 of part-circular section and which deepen downwardly from positions intermediate the ends of the tubular member 65, to form the apertures 73 for material cut by the blades. The lower ends of the curved walls 71 of the grooves are cut away as shown at 72 to accomodate the cutter blade assembly.

The chopper unit shown in FIG. 11 is appropriate for a chopping action, though the cutter blade assemblies described are capable also of a liquidizing action, when operated at a relatively high speed. To facilitate the flow of liquidized material upwardly through the apertures in the unit and then downwardly to rejoin the material below the blades, the cutter blade assembly is for this purpose preferably raised to some three-eighth of a inch above the floor 64 and to enable this to be done the collar 62 and the mouth of the container 61 are so arranged that rotation of the collar through 90° from the position shown raises the drive unit 10 by the desired amount. For this purpose, the collar 62 is arranged to rest on a helical ramp formed internally of the top of the container.

When any of the above described arrangements of chopper unit are used for chopping or shredding solid food materials, the ring serves to hold the food material to be cut, for example a potato, whilst the blades of the cutter assembly advance progressively through the material as they reduce it to slices or flakes. By varying the speed of the cutter assembly, the comminution of the material can be varied. The ring serves to cut material from the solid mass thereof, which cut material is then forced upwardly relative to the ring whilst being reduced in size by the cutting edges of the rotating blades. It is found that for such a chopping or shredding operation, the blades should be rotated in the speed range of from 400 to 600 r.p.m. However, the same chopper unit can be used to liquidize semi-solid food material, and for this purpose the blades should be rotated at a higher speed - and typically in the range of from 8,000 to 24,000 r.p.m. By providing a two speed gear box 14 the drive outputs with the above two ranges may be obtained, and by providing the two speed electrical control switch 16, two speeds within each range may be obtained.

I claim:

1. A chopper unit for chopping food material, the unit comprising a shaft arranged to receive a rotational drive at one end, cutter blade means secured to said shaft at the other end thereof, a generally tubular member rotatably mounting said shaft and extending towards said cutter blade means, a ring supported by said tubular member so as to surround said cutter blade means, the ring having a cutting edge extending around at least the major part of the periphery of the area swept by said cutter blade means at a position longitudinally of said shaft beyond said cutter blade means, and at least one aperture for chopped food material between said ring and said tubular member supporting said ring.

2. A chopper unit as claimed in claim 1, in which said tubular member has a plurality of grooves extending in the wall thereof from a longitudinally intermediate position towards the end of the tubular member supporting the ring, the grooves deepening towards the ring to provide a plurality of said apertures.

3. A chopper unit as claimed in claim 1, in which a plurality of arms support said ring on said tubular member, the said apertures thereby being formed between said arms, said ring and said tubular member.

4. A chopper unit as claimed in claim 1 in which said cutter blade means provides a cutter edge having opposed inner portions extending in alignment on a diameter outwardly from the shaft axis, and an outer portion extending from each inner portion to a free end in close adjacency with said ring, the outer portions being inclined to the diameter rearwardly in the rotational direction.

5. A chopper unit as claimed in claim 4, in which said cutter blade means comprises a pair of blades each providing an inner and an outer edge portion, said blades each being inclined to a plane including the diameter and normal to the shaft axis in a direction away from the cutting edge of said ring.

6. A chopper unit as claimed in claim 5, in which said outer portions of the cutter blade means are convexly curved.

7. A chopper unit as claimed in claim 4, in which said cutter blade means is formed integrally from a single strip of metal.

8. A chopper unit as claimed in claim 2, in which said cutter blade means has two blades and a continuous leading cutter edge extending between said two blades thereof.

9. An apparatus for chopping food material, the apparatus comprising the combination of a chopper unit as claimed in claim 1 and a motor unit, the motor unit having an electric motor, a rotational drive output from said motor connected to said chopper unit shaft, and a non-rotatable connection to the chopper unit tubular member.

10. An apparatus as claimed in claim 9, in which the speed of the rotational drive output can be selected to be one of a first speed suited to a chopping action of the chopper unit to produce slices and a higher speed suited to a liquidizing action thereof to produce a pulp.

11. An apparatus as claimed in claim 10, in which the first speed can be varied over the range of 400 to 600 rpm and the higher speed can be varied over the range of 8,000 to 24,000 rpm.

12. An apparatus as claimed in claim 9, in which said chopper unit and said motor unit are releasably connected.

* * * * *

UNITED STATES PATENT AND TRADEMARK OFFICE
CERTIFICATE OF CORRECTION

PATENT NO. : 4,019,689
DATED : April 26, 1977
INVENTOR(S) : William Joseph Hunt

It is certified that error appears in the above-identified patent and that said Letters Patent are hereby corrected as shown below:

Column 1, line 8, "copper" should read --chopper--.

Column 3, line 19, "wwith" should read --with--.

Column 3, line 28, "a" (first occurrence) should read --an--.

Column 3, line 58, "$\alpha$" should read --$\beta$--.

Page 1, in the foreign application priority date, the serial Number of the priority application should be read as --45544/74--.

Signed and Sealed this

Twenty-second Day of November 1977

[SEAL]

Attest:

RUTH C. MASON
Attesting Officer

LUTRELLE F. PARKER
Acting Commissioner of Patents and Trademarks